June 7, 1932.  J. H. FOX  1,861,627
APPARATUS FOR MAKING PLATE GLASS
Filed Aug. 15, 1928   10 Sheets-Sheet 1

June 7, 1932. J. H. FOX 1,861,627
APPARATUS FOR MAKING PLATE GLASS
Filed Aug. 15, 1928   10 Sheets-Sheet 4

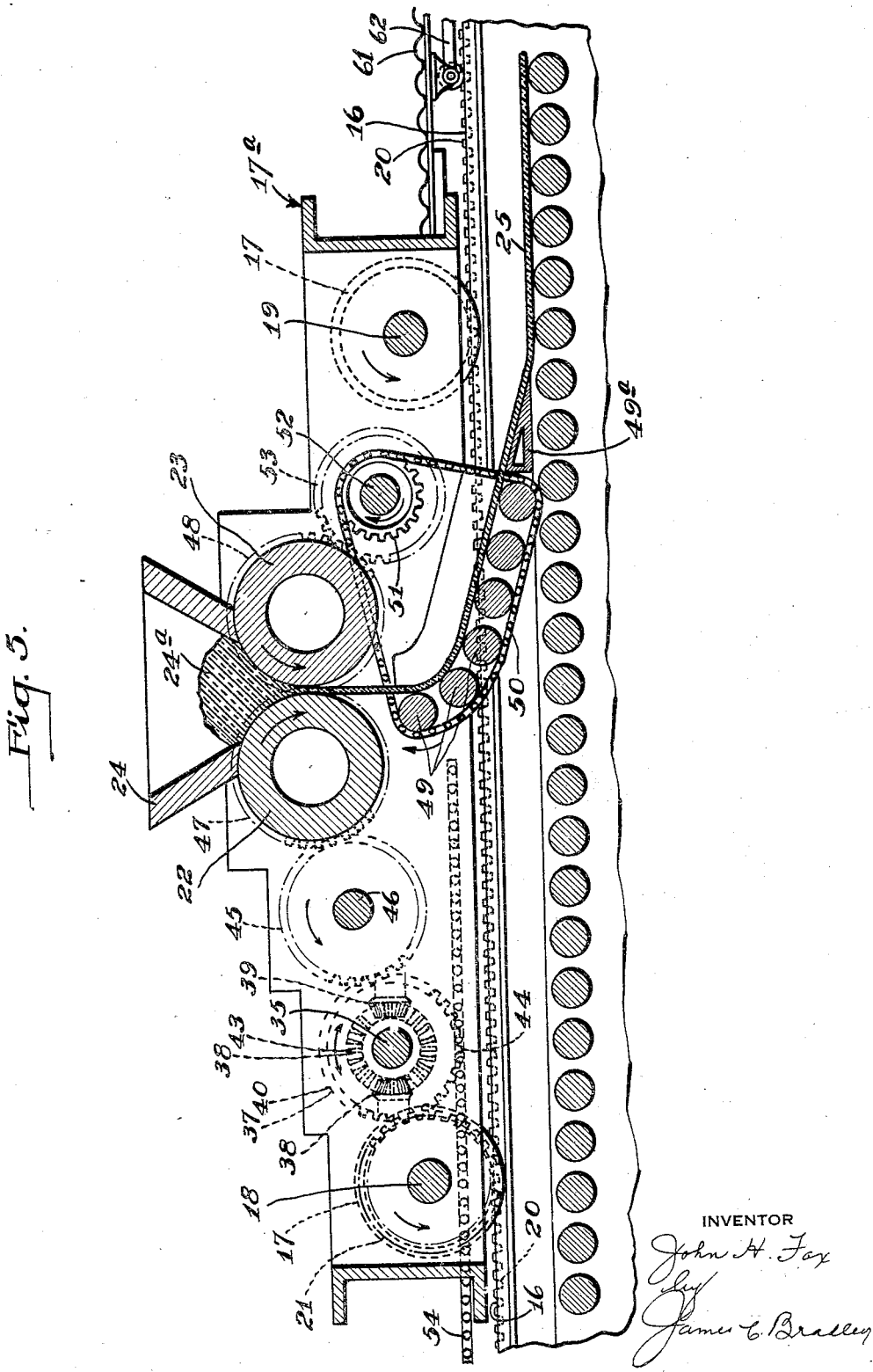

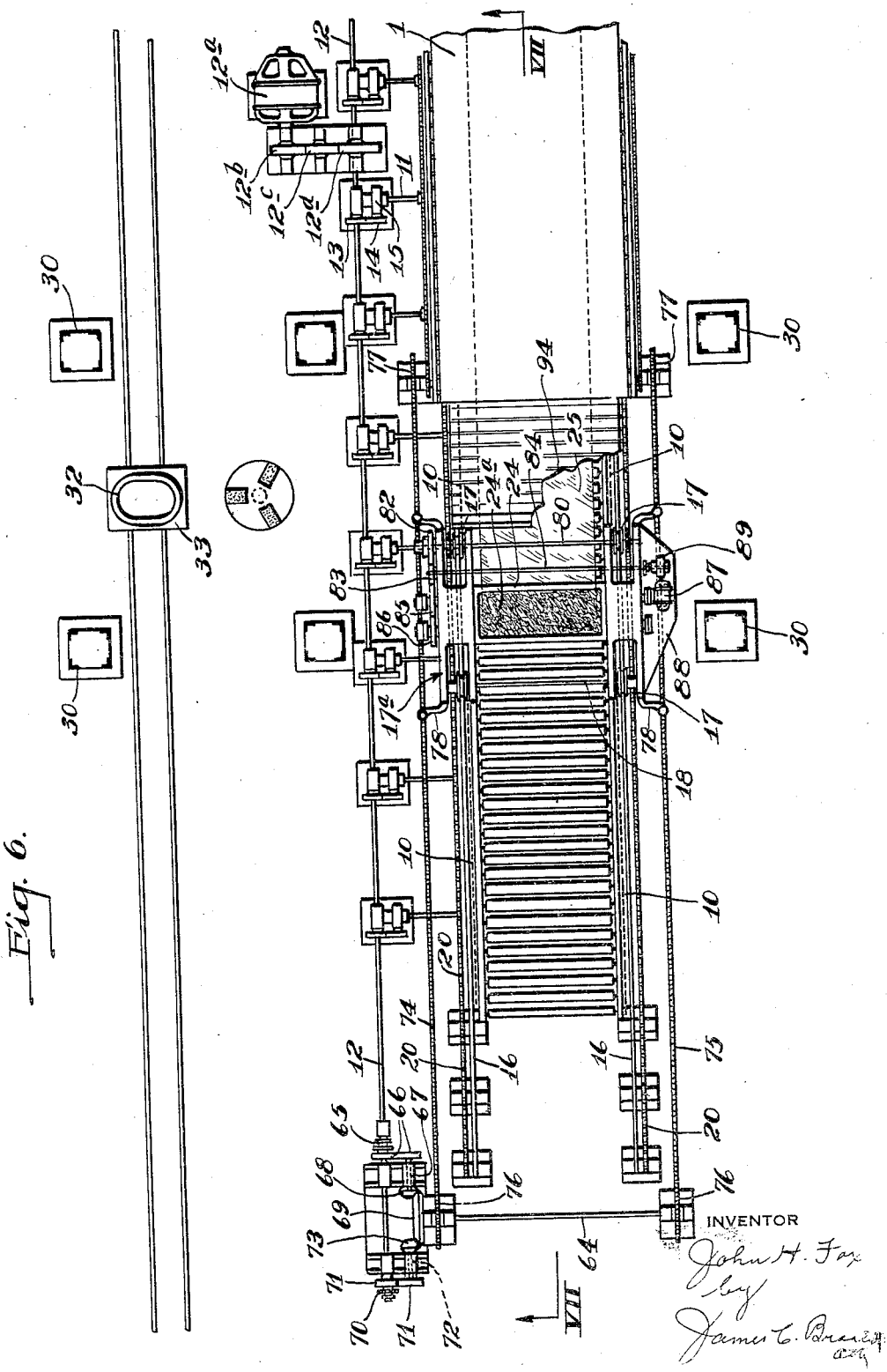

June 7, 1932.  J. H. FOX  1,861,627
APPARATUS FOR MAKING PLATE GLASS
Filed Aug. 15, 1928    10 Sheets-Sheet 7
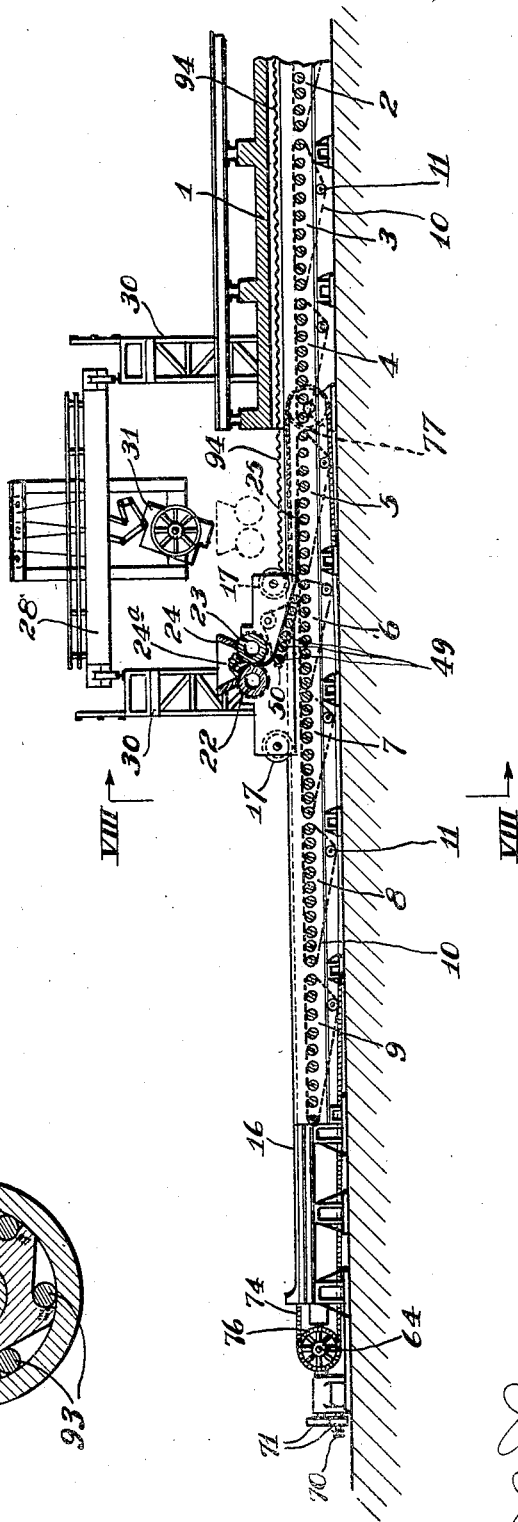
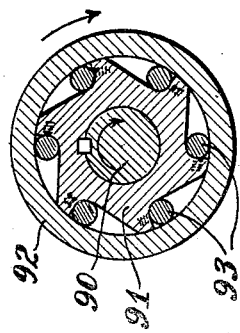
INVENTOR

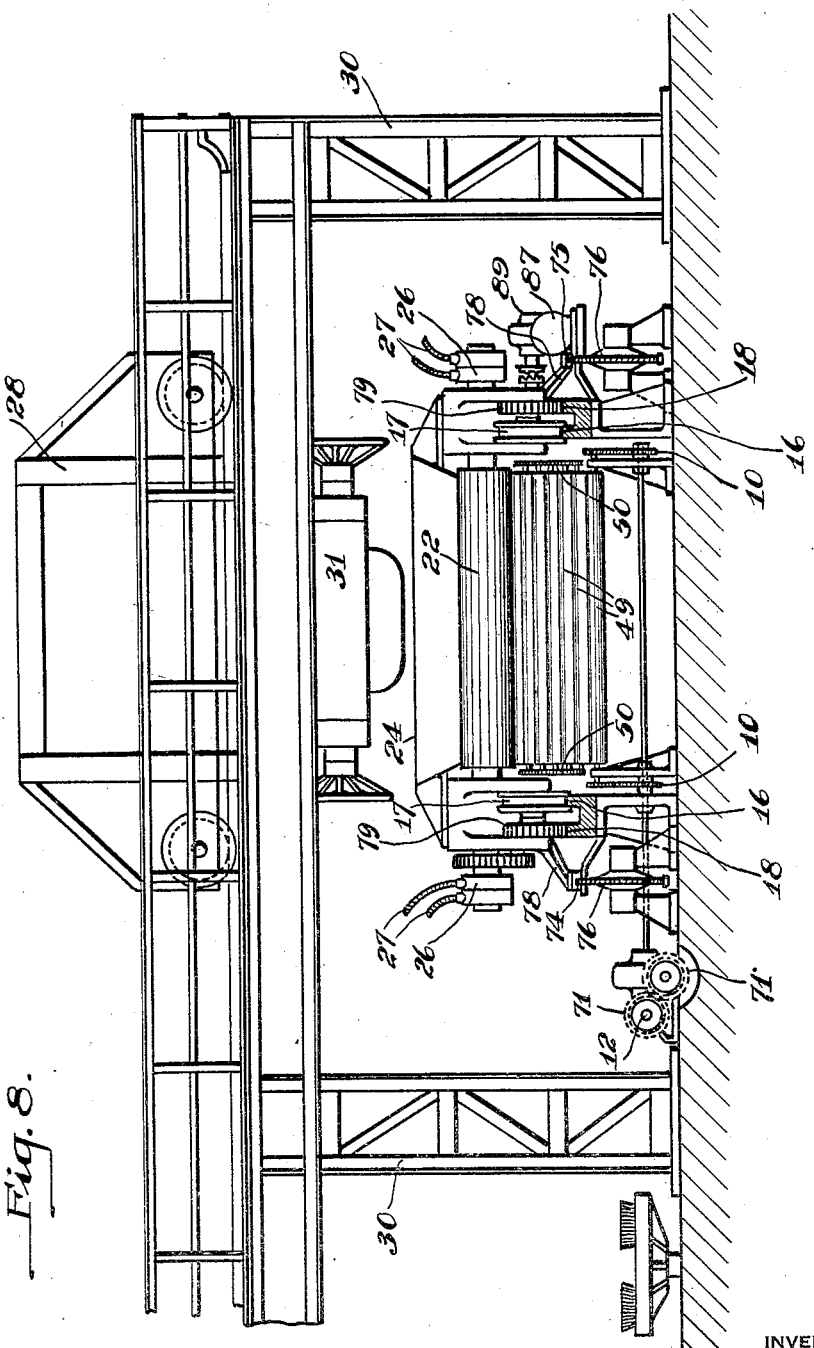

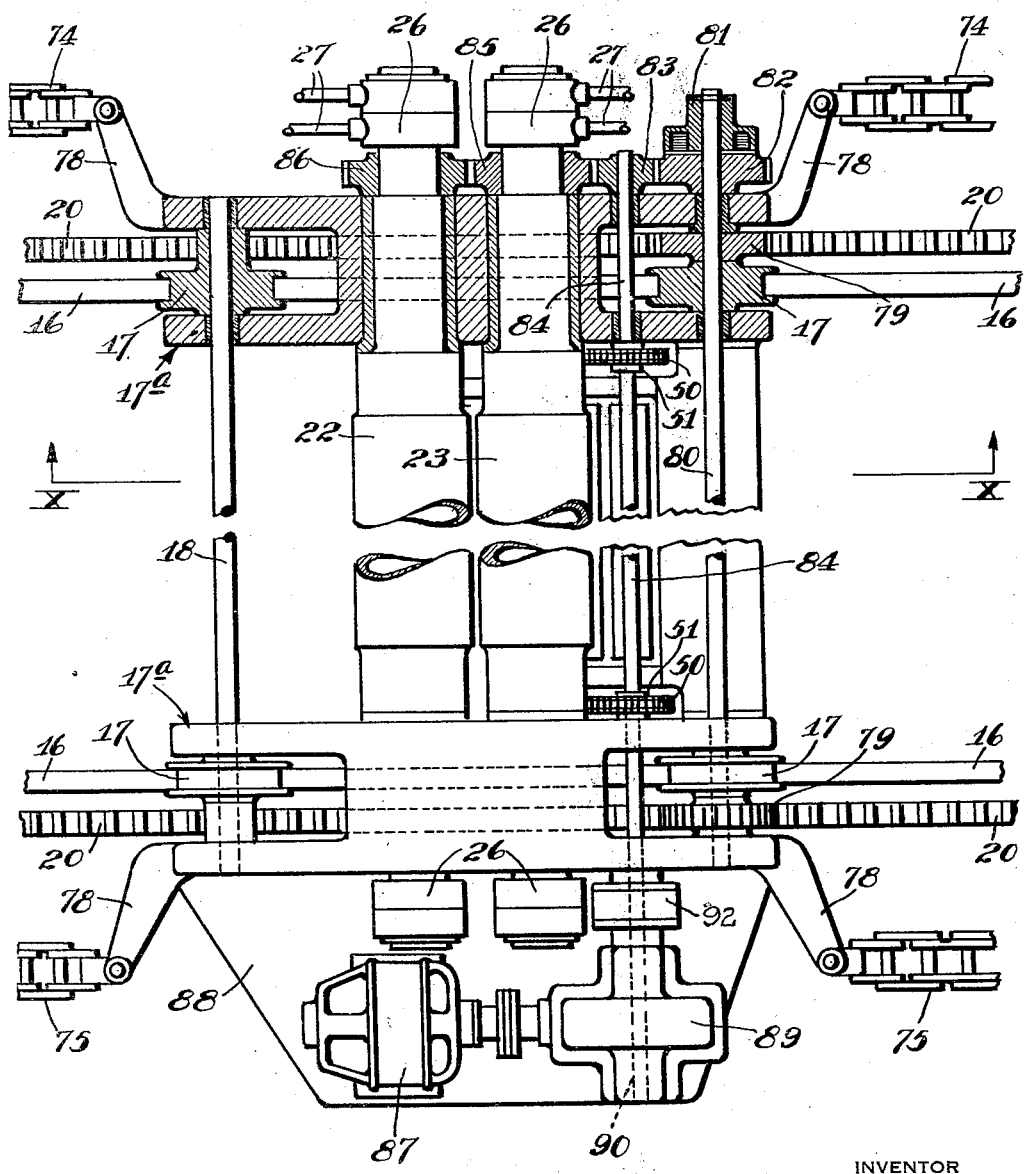

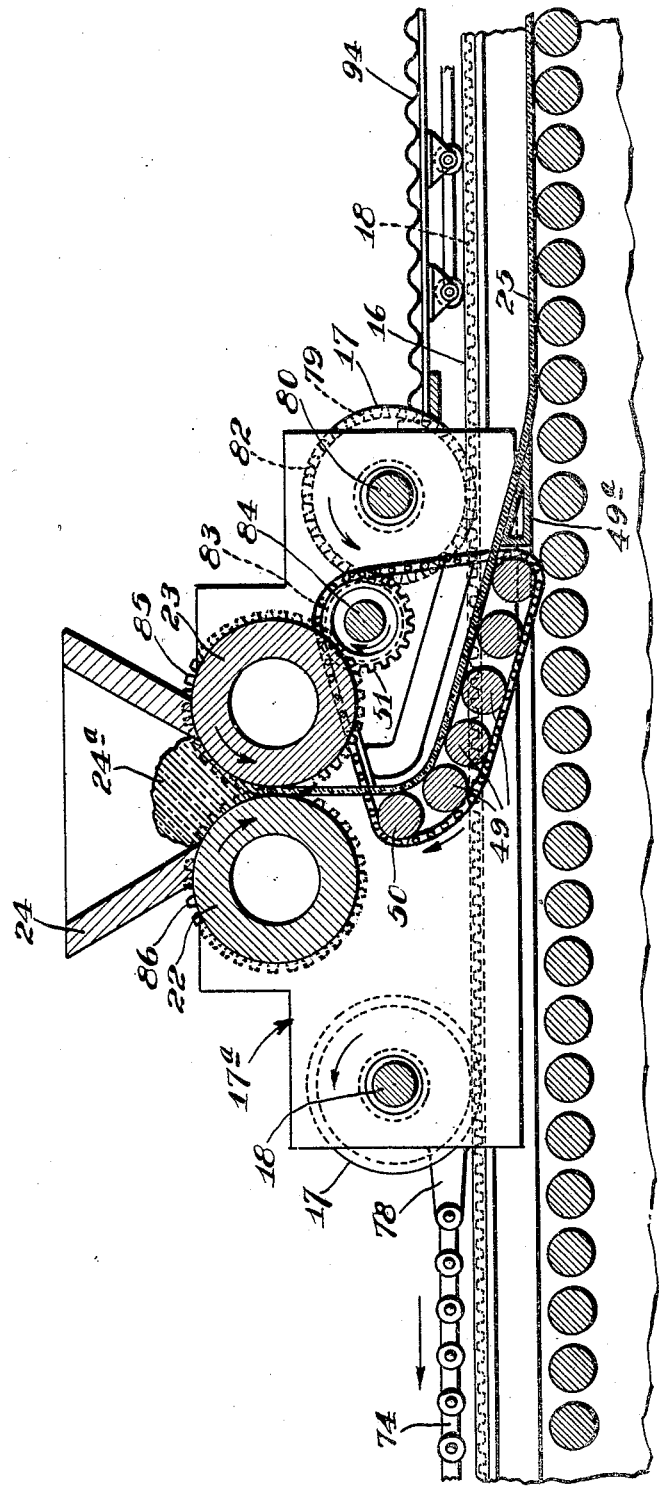

Patented June 7, 1932

1,861,627

UNITED STATES PATENT OFFICE

JOHN H. FOX, OF PITTSBURGH, PENNSYLVANIA, ASSIGNOR TO PITTSBURGH PLATE GLASS COMPANY, A CORPORATION OF PENNSYLVANIA

APPARATUS FOR MAKING PLATE GLASS

Application filed August 15, 1928. Serial No. 299,751.

Figure 1:
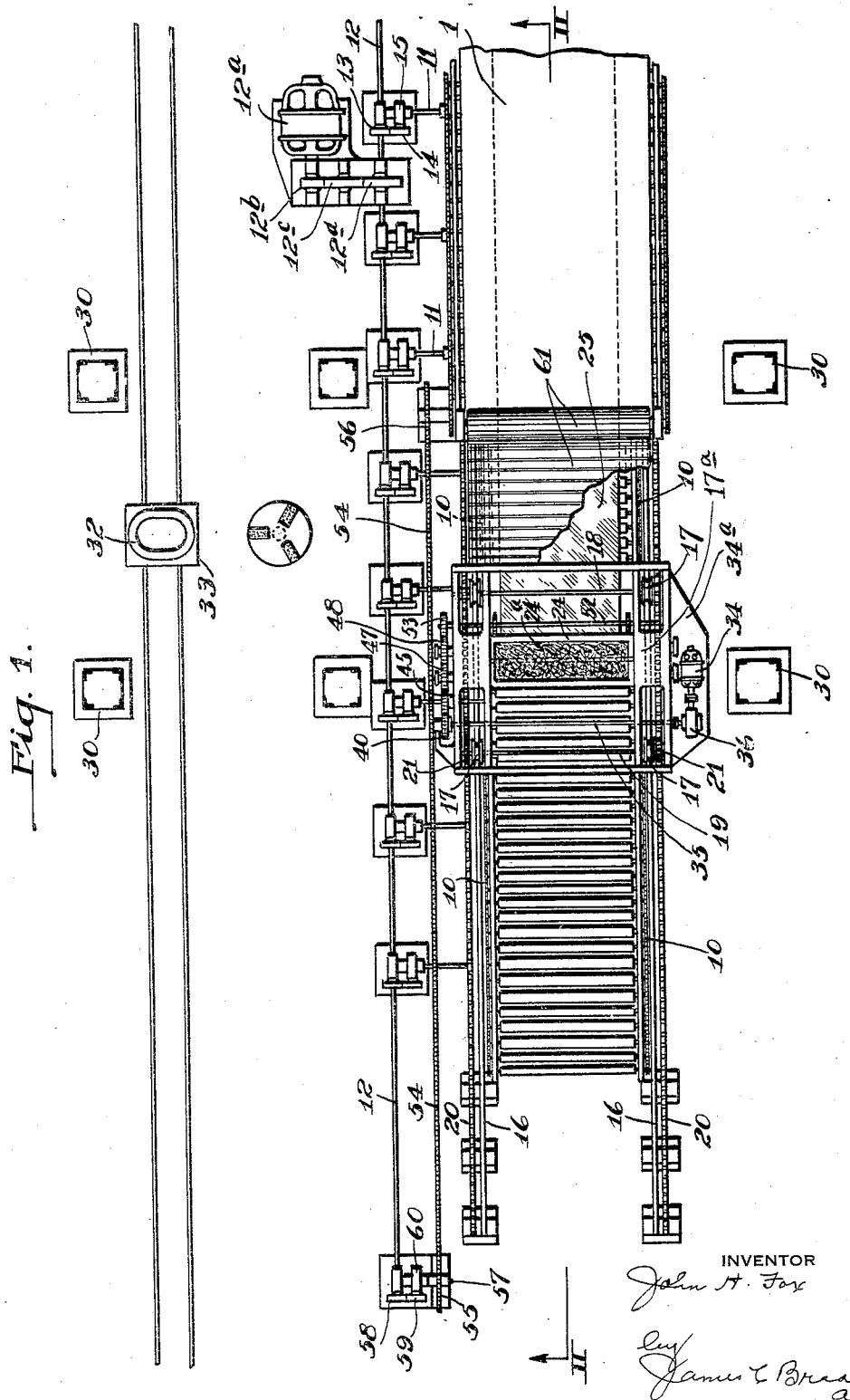
Figure 2:
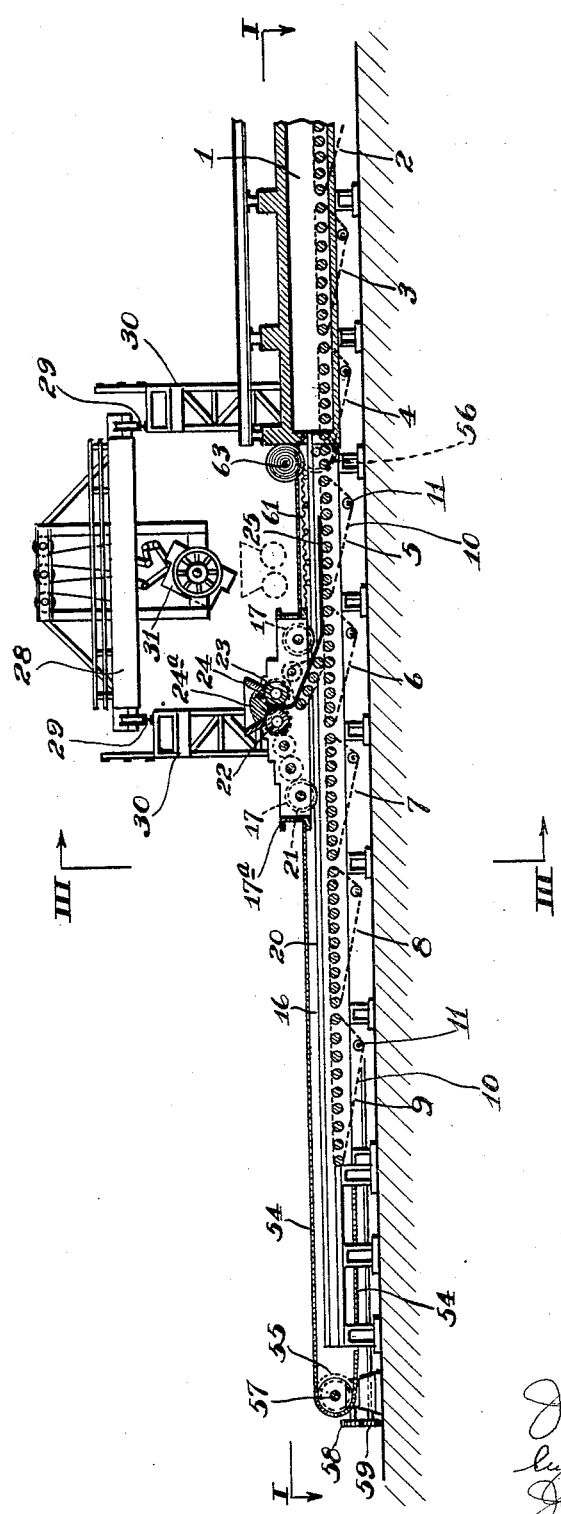
Figure 3:
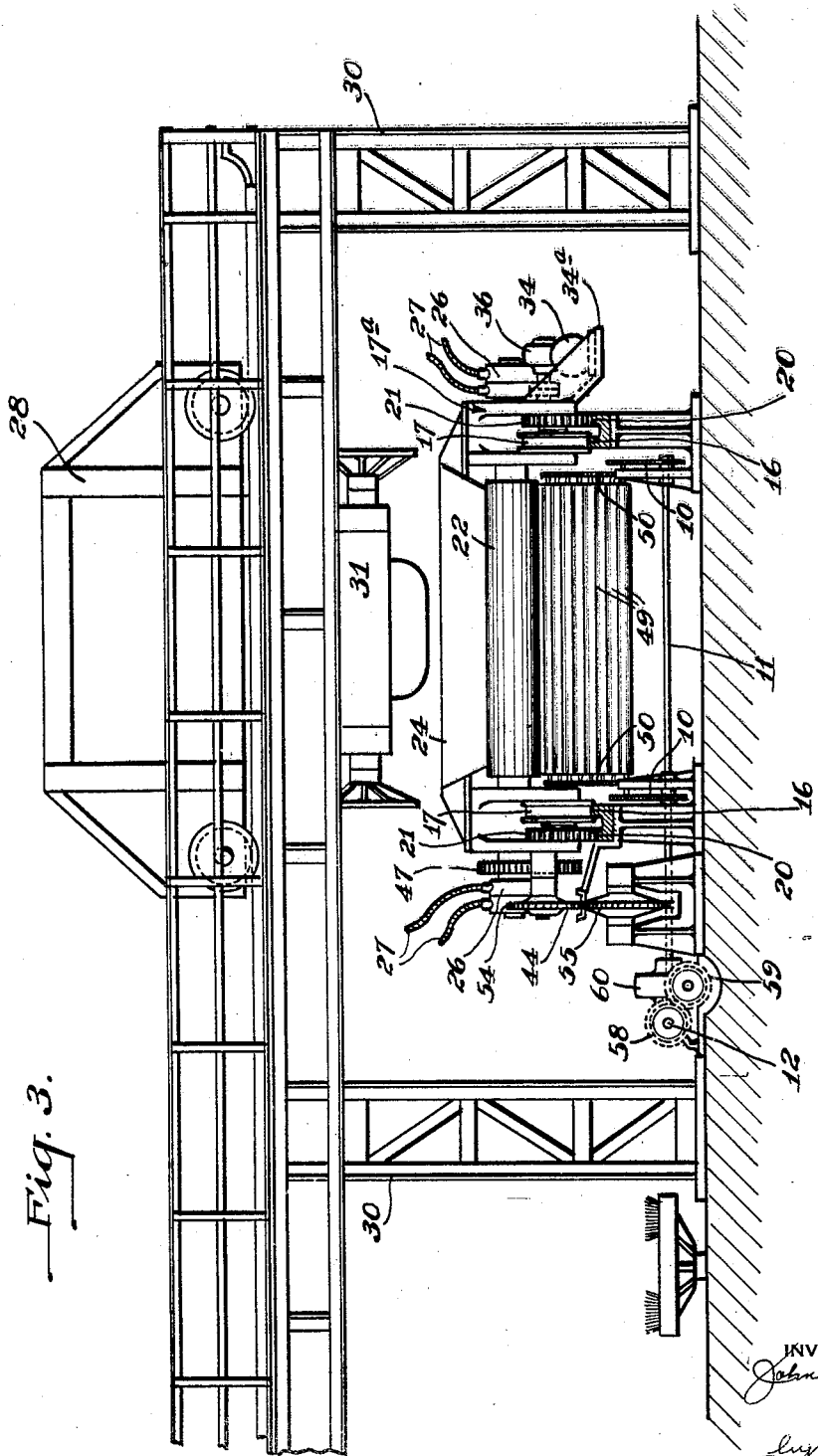
Figure 4:
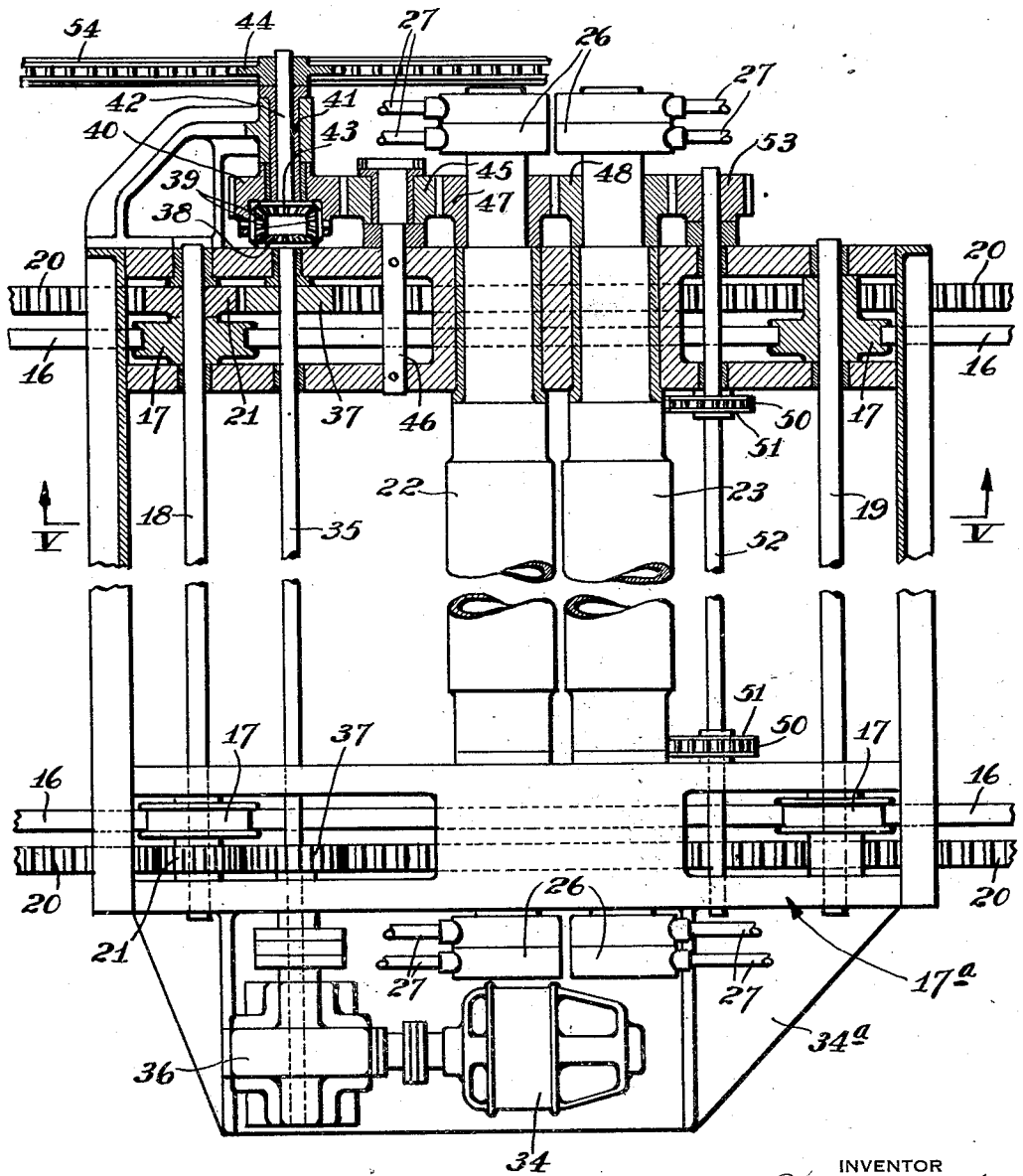

The invention relates to apparatus for making plate glass, and has for its principal objects, the provision of an improved apparatus permitting of the formation of the glass sheets at relatively high rolling speeds, and the annealing of the glass at relatively low speeds; and the provision of an apparatus of the character specified, wherein the leer and the runway leading into the leer may be operated at a single speed instead of using two speeds as has been heretofore done, thus simplifying the leer drive. Certain embodiments of the invention are illustrated in the accompanying drawings, wherein:

Figure 1 is a section on the line I—I of Fig. 2, and shows the major portion of the apparatus in plan. Fig. 2 is a longitudinal section on the line II—II of Fig. 1. Fig. 3 is a transverse section on the line III—III of Fig. 2. Fig. 4 is an enlarged detail view of the casting car partially in plan and partially in section. Fig. 5 is a section on the line V—V of Fig. 4. Figs. 6 to 10 show a modification corresponding in the character of the views to Figs. 1 to 5. And Fig. 11 is a detail view showing a section through one of the ratchet clutches employed in the Figs. 6 to 10 construction.

Briefly stated, the construction as shown comprises, in both forms of apparatus, a single speed roller leer with an approach runway forming a continuation of the roller leer and operated at the same speed, in combination with a car, provided with casting or sizing rolls, mounted above the approach runway, which car travels back and forth along the runway. In starting the casting operation, the car is positioned at the forward end of the runway (next to the leer) and a body of molten glass is poured between the rolls. The car is now run backward along the runway, the sizing rolls being rotated at the desired rate for sheet formation, which speed of rotation is greater than the backward movement of the car by an amount equal to the speed of rotation of the runway rolls. The sheet, which is thus formed, is deposited on the runway beneath. By the time the car has reached the rear end of the runway, the molten glass between the rolls will have become exhausted and the completed sheet deposited upon the runway, which carries it into the leer. This operation permits the sheet to be rolled or formed at as high a speed as may be necessary in order to produce glass of the desired quality, while permitting the runway and leer to be operated at as low a speed as may be desirable in order to keep the leer length within reasonable limits. For example, if it is desired to operate the runway and leer at the rate of ten feet per minute, and to roll the sheet at the rate of forty feet per minute, the car carrying the sizing rolls would be moved to the rear at the rate of thirty feet per minute. This would result in the sheet engaging the runway rolls, while moving forward at the rate of ten feet per minute which is the rate of peripheral movement of the runway rolls, so that there is no tendency either to thin the sheet (as would be the case if the runway rolls had a peripheral speed substantially greater than the rate of forward movement of the sheet) or to buckle the sheet (as would be the case if the runway rolls had a peripheral speed less than the rate of forward movement of the sheet). As a matter of practice, it has been found that a very slight stretching of the sheet after leaving the forming or sizing rolls is desirable, as this gives a flatter sheet, and it will be understood that the design of the apparatus contemplates having the rolls which receive the sheet from the forming rolls operate at a little higher speed than the forming rolls. The difference in speed, however, is very slight, not over one or two per cent, so that there is no perceptible thinning of the sheet due to this difference in speed, and so that the leer and runway rolls may be properly described as having a peripheral speed approximately the same as the forward speed of movement of the sheet.

Referring to the drawings, 1 is the rear end of the leer, three of whose sections 2, 3 and 4 are shown, and 5, 6, 7, 8 and 9 are sections similar to the leer sections and constitute a runway leading into the leer. All of the leer and runway sections are alike, consisting of a series of rolls provided at their ends with sprockets around which pass the sprocket chains 10, 10, etc. These chains are driven from the cross shafts 11, 11, etc. provided with sprockets which engage the chains. All of the shafts are driven from the leer drive shaft 12, which extends the length of the leer and runway and is provided with the series of spur gears 13, 13, etc. The cross shafts are driven from the gears 13, 13, etc. through the intermediary of the gears 14, 14, etc. and worm reduction gearing in the casings 15, 15, etc. The shaft 12 is driven from the motor 12a through the intermediary of the spur gears 12b, 12c, and 12d (Fig. 1).

Extending along the sides of the runway are the rails 16, 16 and on this track is mounted the car or truck 17a having four wheels 17 carried by the shafts 18 and 19 engaging the track. Also extending along the runway are the racks 20, 20 which are engaged by two gears 21, 21 keyed to the shafts 18. The car also carries the sizing rolls 22 and 23, above which is mounted a hopper 24 for receiving the body 24a of molten glass which is rolled into the sheet 25. The rolls are hollow, being provided at the ends with the swivels 26 connected to the pipes 27 by means of which the rolls are cooled by a circulation of water in the usual way.

Glass is supplied to the hopper 24 by means of the crane 28 carried by the columns 30. This crane is provided with a teeming device 31 for picking up a pot of glass and pouring it into the hopper. The pot 32 (Fig. 1) of glass to be cast or poured is brought from the pot furnace in a truck 33, and is then lifted from such truck and carried to a position over the hopper 24 by the device 31 and crane 28 and poured.

The car 17a is moved back and forth along the rails 16, 16 by means of the motor 34 carried by a bracket 34a projecting laterally from the side of the car. This motor drives the shaft 35 through the intermediary of a worm reducer in the casing 36, and this shaft is provided with the gears 37, 37 engaging the gears 21, 21 on the shaft 18 carrying the wheels 17. As heretofore pointed out, the gears 21, 21 engage the racks 20, 20 so that the rotation of these gears moves the car along the rails.

The end of the shaft 35 is provided with a bevel gear 38 which engages the pair of gears 39, 39 forming a part of a differential drive. The gears 39, 39 are journalled on pins carried by the hub of a spur gear 40, such last gear being free to rotate on the bushing or sleeve 41 in which the shaft 42 is mounted for rotation. The shaft 42 has at one end the bevel gear 43 meshing with the gears 39, 39 and at its other end has a sprocket 44. When the shaft 35 and its gear 38 are held against rotation and the shaft 42 is rotated, the gear 40 will be rotated. This drives the gear 45 on the shaft 46, which meshes with a gear 47 keyed to the end of the roll 22. A gear 48 on the roll 23 engages the gear 47 so that the driving of the shaft 42 rotates both rolls. As heretofore pointed out, the peripheral rate of movement of the sizing rolls under these conditions is approximately that of the runway and leer rolls. This also provides a drive for an apron made up of the rolls 49 and the water cooled plate 49a for receiving the glass sheet from the sizing rolls and conducting it to the runway, sprocket chains 50 passing around sprockets on the ends of the rolls 49 and around sprockets 51 on the cross shaft 52. The cross shaft has a gear 53 at one end meshing with the gear 48 on the roll 23.

The sprocket 44 is driven by an endless chain 54 passing around the driven sprocket 55 and the idler sprocket 56, the former being carried by a shaft 57 (Fig. 2) driven from the drive shaft 12 through a train of gearing including the spur gears 58 and 59 and worm gearing in the casing 60. The sizing rolls 22 and 23 are thus driven at substantially the same rate of peripheral speed as the runway and leer rolls when the carriage is not in movement.

When the carriage 17a is moved to the rear (to the left in Figs. 1 and 2) the sizing rolls are driven at an increased rate of peripheral speed corresponding in amount to the speed at which the carriage moves. This is due to the drive of the shaft 35 by the motor 34 so that the gear 38 forming a part of the differential (made up of gears 38, 39, 39 and 43) instead of being held stationary is moved in a direction such that the speed of rotation of the gear 40 is increased by an amount corresponding to the speed of movement of the car. This correspondingly speeds up the rotation of the sizing rolls 22 and 23. As the car moves to the left, therefore, the glass sheet is rolled out at a speed approximately equal to the sum of the rate of movement of the carriage and the rate of peripheral movement of the runway rolls, so that the glass sheet as it engages the rolls of the runway sections 5 to 9 has an absolute speed of movement forward which is approximately that of the speed of rotation of such runway rolls. For the reason stated heretofore, the peripheral speed of the runway rolls may be slightly in excess of that of the forward movement of the sheet in order to apply a slight tension, but this is not essential and should not be sufficient to appreciably stretch or thin the sheet.

By the time the carriage reaches the left hand end of the tracks, the molten glass in the hopper is exhausted and the complete sheet is formed and on the runway sections 5 to 9. The hopper 24 can now be cleaned and the car run back to starting position by reversing the motor 34. The apparatus is now ready for another casting operation, which can be started as soon as the tail of the sheet just cast passes to the right of the apron leading from the sizing rolls down to the runway rolls. In this manner, the sheets may be made to follow each other closely in the leer so that the full capacity of the leer is utilized and its temperature kept relatively uniform.

In order to prevent too rapid cooling of the glass sheet on the runway while it is being moved into the leer, a cover is employed which is pulled over the sheet as it is formed and as the car 17a moves to the left (Figs. 1 and 2). This cover 61 is of flexible construction, such as asbestos fabric, or is made up of plates hinged together and is provided at its edges with a pair of roller chains 62 (Fig. 5). This cover is rolled onto the shaft 63 when not in use and has one end attached to the end of the car 17a. As the car moves to the left (Fig. 2) during the rolling operation, the cover is pulled to the left covering the sheet as it is formed. During this movement, the chains at the edges of the cover ride upon the rails 16, 16. When the car moves back to the right again after the rolling operation, the cover is wound onto the shaft 63 again.

The construction of Figs. 6 to 11 operates on the same principle as that of Figs. 1 to 5, and for the most part the constructions are identical. Parts which are identical are given the same reference numerals and require no further description. The principal differences have to do with the driving means for the sizing rolls and with the cover which is used in place of cover 61 of the Figs. 1 to 5 construction. In the present construction, the differential of the Figs. 1 to 5 construction is omitted and two independent drives are employed for the sizing rolls, with clutch connections, so that when either drive is operating, the other one is released. When the car is stationary, the sizing rolls are driven from a motor carried by the sizing roll car, but when the car is moved from the leer drive, thus rotating the sizing rolls by means of a rack and pinion connection, as in the other construction, the clutch connection with the motor is released.

Referring to the drawings, the leer drive shaft 12 drives the cross shaft 64 through a magnetic clutch 65, the gears 66, the shaft 67 and the bevel gears 68 and 69. This drive may be reversed (when the clutch 65 is released) through the magnetic clutch 70, gears 71, shaft 72 and bevel gears 73 and 69. The cross shaft drives the two endless chains 74 and 75 which pass around the pairs of sprockets 76 and 77 and are secured intermediate their ends to the brackets 78 secured to the car.

A gear 79 keyed to the shaft 80 engages one of the racks 18 (Fig. 9) which shaft also has keyed to it the magnetic clutch member 81 adapted when energized to turn the gear 82 loose on the shaft. The gear 82 engages a gear 83 keyed to the shaft 84, and this gear in turn engages a gear 85 keyed to the sizing roll 23. The gear 85 engages a gear 86 keyed to the sizing roll 22. By this arrangement, the movement of the car is caused to rotate the sizing rolls at a rate of peripheral speed which is greater than the speed of movement of the car, as in the other construction, this being accomplished by a proper proportioning of the gears. The apron rolls 49 for receiving the glass sheet from the sizing rolls are driven from the shaft 80 by the chains 50, 50.

The sizing rolls 22, 23 may be driven, when the car is stationary, by means of the motor 87 carried by the bracket 88 secured to the car. This motor drives the shaft 84 through suitable worm gearing in the casing 89 and the gear 83 drives the sizing rolls as heretofore described. During this latter driving operation, current to the winding of the magnetic clutch 81 is cut off so that the gear 82 rotates as an idler on the shaft 80. During this period, current is also cut off from the winding of the clutch 65 so that the rotation of the shaft 64 and the movement of the chains and car are interrupted.

When the pouring operation is started, the windings of the clutches 65 and 81 are energized, thus securing a movement of the car to the right accompanied by a rotation of the sizing rolls 22 and 23. At the same time, the supply of current to the motor 87 is cut off. Means are provided for preventing the rotation of the motor 87 from the shaft 84 as the car moves to the right, such means being in the form of a one-way pin or ratchet clutch interposed between the end of such shaft and the end of the shaft 90 which carries the worm wheel in the casing 89. This form of clutch is well-known in the art, but is shown in section in Fig. 11, wherein the cam member 91 is carried by the shaft 90 and the casing 92 is secured to the end of the shaft 84. The rollers 93 lock the cam member to the casing on a relative movement of the parts in one direction and are released on a relative movement in the other direction. This permits the motor 87 to drive the shaft 84, but prevents the shaft from driving the motor after the supply of current to the motor has been cut off. The dotted line position of the sizing rolls and hopper as showing both in Fig. 7 and Fig. 2 is that occupied when the operation of pouring from the pot is carried out, the car then being at its extreme right hand position.

The cover 94 (Fig. 7) for preventing too rapid cooling of the glass sheet after formation and before it is gotten into the leer is, in this construction, extended into the leer as shown, being attached at its front end to the car, so that as the car moves to the left, the cover is dragged out of the leer and protects the sheet. The cover is preferably of corrugated sheet metal having roller chains along its edges which ride on the tracks 16, 16 and an extension thereof in the leer. When the car moves to the right after the pouring operation, the cover is pushed back into the leer.

What I claim is:

1. Apparatus for making a sheet of glass, comprising a leer having continuously operating forwarding means, a runway at the entrance end of the leer also having continuously operating forwarding means constituting an extension of the forwarding means in the leer, a car mounted for movement back and forth along the runway, means for moving the car, a pair of sizing rolls carried by the car above the runway, means for rotating the sizing rolls as the car is moved back along the runway, and a cover which is moved over the runway by the car as said car is moved back.

2. Apparatus for making a sheet of glass, comprising a roller leer having a roller runway at its entrance end constituting a continuation of the leer runway, a car mounted for movement along the runway, a pair of sizing rolls carried by the car above the runway, means for driving the sizing rolls and the leer and runway rolls at approximately the same rate of peripheral speed when the car is stationary, driving means for moving the car along the runway, and connections whereby the speed of movement of the car is added to the peripheral speed of the sizing rolls during such movement of the car.

3. Apparatus for making a sheet of glass, comprising a roller leer having a roller runway at its entrance end constituting a continuation of the leer runway, a car mounted for movement along the runway, a pair of sizing rolls carried by the car above the runway, means for driving the sizing rolls and the leer and runway rolls at approximately the same rate of peripheral speed when the car is stationary, driving means for moving the car along the runway, and connections including a differential whereby the speed of movement of the car is added to the peripheral speed of the sizing rolls during such movement of the car.

4. Apparatus for making a sheet of glass, comprising a roller leer having a roller runway at its entrance end constituting a continuation of the leer runway, a car mounted for movement along the runway, a pair of sizing rolls carried by the car above the runway, means for driving the sizing rolls and the leer and runway rolls at approximately the same rate of peripheral speed when the car is stationary, driving means for moving the car along the runway, and connections including a fixed rack, a pinion engaging the rack carried by the car, a differential, and driving connections therefrom to the sizing rolls, whereby the speed of movement of the car is added to the peripheral speed of the sizing rolls during the movement of the car.

5. Apparatus for making a sheet of glass, comprising a leer having continuously operating forwarding means, a runway at the entrance end of the leer also having continuous operating forwarding means constituting an extension of the forwarding means in the leer, a car mounted for movement back and forth along the runway, means for moving the car, a pair of sizing rolls carried by the car above the runway, means for rotating the sizing rolls as the car is moved back along the runway, and a cover mounted for movement above the runway and attached at one end to said car with its other end in telescopic relation with the leer.

6. Apparatus for making a sheet of glass, comprising a leer having continuouly operating forwarding means, a runway at the entrance end of the leer also having continuous operating forwarding means constituting an extension of the forwarding means in the leer, a car mounted for movement back and forth along the runway, means for moving the car, a pair of sizing rolls carried by the car above the runway, means for rotating the sizing rolls as the car is moved back along the runway, a roller at the end of the leer, and a flexible cover of refractory material attached at one end to the car and secured to the roller at its other end, and adapted to be rolled thereon when the car moves toward the leer.

In testimony whereof, I have hereunto subscribed my name this 24th day of July, 1928.

JOHN H. FOX.